Patented Sept. 17, 1935

2,014,953

UNITED STATES PATENT OFFICE 2,014,953

RESINOUS COMPOSITIONS AND PROCESS OF MAKING THE SAME

Paul F. Schlingman and Roy H. Kienle, Schenectady, N. Y., assignors to General Electric Company, a corporation of New York No Drawing. Application May 21, 1931, Serial No. 539,145

8 Claims. (Cl. 18—55)

This invention relates to resinous compositions and process of making the same. Specifically, it is concerned with resinous compositions produced in a novel manner from a phenol, aromatic amine and aldehyde, the resulting compositions having good flow, being easily moldable at relatively low molding pressures, without the addition of fillers, to translucent homogeneous products of high mechanical strength and very good dielectric properties.

In a copending application of Roy H. Kienle, Serial No. 539,146, filed concurrently herewith and assigned to the assignee of the present application, there is disclosed and claimed resinous compositions of the phenolic type which are moldable without the addition of fillers to yield translucent products of good dielectric strength. Such products while useful in numerous applications do not possess sufficient mechanical strength for certain other applications. It is, therefore, one of the principal objects of the present invention to mechanically strengthen the resinous compositions of the type disclosed in the said Kienle application without resorting to the conventional method of adding fillers. Another object of the invention is to improve the dielectric properties of the resinous compositions of the type referred to above. Other and further objects of this invention will be more apparent as the description thereof proceeds.

In accordance with our invention an aromatic amine, such as aniline, is reacted with an aldehyde, such as formaldehyde, in the presence of an acid and in aqueous solution to a certain definite point. To this reacted mass is added a suitable solution of a phenolic resin taken at a definite stage in its preparation according to methods more fully set forth in said Kienle application above referred to and a mutual precipitation of the two resinous compositions occurs. The resins are thus caused to come out of solution in such a manner that each particle of precipitate is an intimate association of the two types of resin. A product is thus obtained which on thorough washing and drying has good flow, is easily molded into various intricate shapes and forms to a finished product of high mechanical strength and very good dielectric properties.

In order to more fully illustrate our invention the following descriptive examples are given:

Example I

A. 93 parts by weight (1.0 mol) aniline.
100 parts by volume (1.0 mol) con. HCl
102 parts by volume (1.1 mol) 32.5% formaldehyde are mixed together in a suitable quantity of water, say, 1000 parts by volume, and the mixture allowed to stand at room temperature (25°–30° C.) for one hour with occasional stirring.

B. A resin based on the following formula is made according to the usual phenolic resin technique:

| | Parts by weight |
|---|---|
| Phenol | 200 |
| Aqueous formaldehyde (40%) | 160 |
| Water | 40 |
| Ammonia | 11 |

The resin is boiled down to a 30 second cure on 160° C. hot plate. The cure point of the resin is not necessarily fixed as indicated but may be within the approximate limits: 30 and 120 seconds at 160° C.

The aqueous acid solution of aromatic amine-aldehyde condensation product produced in A is diluted with a relatively large volume of water, say, 5000 parts by volume. 600 parts by volume of a 50% alcoholic solution of the phenolic resin produced in B is added to a large volume of water, say, 4000 parts by volume with rapid stirring, and then 400 parts by volume of a 50% alkali solution, e. g. NaOH is added. In place of alcohol any suitable water-miscible solvent may be used, for example, acetone, dioxan, etc., or suitable mixtures thereof, to obtain a solution of the phenolic resin. Upon complete solution of the resin B in the large volume of water, the above prepared solution in water of the aromatic amine-aldehyde condensation product is added thereto with stirring. A precipitate is obtained. Any excess alkali is neutralized with acid, e. g. hydrochloric acid, acetic acid, etc. The precipitate is thoroughly washed and dried. It is very easily molded to a product of high mechanical strength. The molding temperature and pressure will vary with the shape and size of the piece molded. A suitable range of molding temperatures is about 130° C. to 160° C., with pressures up to about 4000 lbs. sq. in.

The above example is merely illustrative of a typical resin which may be produced in accordance with the present invention. It will be noted that in this example the phenolic resin is in excess of the aromatic amine-aldehyde condensation product. Hence excess alkali is present in the mass after precipitation and is neutralized with acid. It is apparent that the proportions of phenolic resin and aromatic amine-aldehyde condensation product may be so chosen that the alkali in one just compensates for the acid in the other, making no neutralization by acid or alkali necessary; or the proportions of phenolic resin and aromatic amine-aldehyde condensation product may be chosen so that there is an excess of acid present after precipitation, in which case it is neutralized with alkali.

Any of the resins prepared as outlined in the above mentioned Kienle application may be utilized in the present invention. To illustrate further:

Example II

A liquid phenolic resin is made by rapidly heating a mixture of:

| | |
|---|---|
| Cresol | 1200 parts by weight |
| Paraformaldehyde | 680 parts by weight |
| Triethanolamine | 100 parts by weight |
| $CaBr_2$ solution (33% aqueous solution) | 120 parts by volume | to 90° C., and immediately chilling. The resulting resin is aged for three weeks at room temperature or until it just starts to become opaque. The resin so prepared may be used in place of the phenolic resin employed in Example I.

Example III

The liquid phenolic resin obtained in accordance with the method outlined in Example II is heated at 90° C.–120° C., until a sample shows a two minute cure or under at 160° C. hot plate. This resin can be utilized in place of the phenolic resin employed in Example I.

Example IV

A cresol resin is prepared by reacting

| | Parts by weight |
|---|---|
| Cresol | 413 |
| Aqueous formaldehyde (40%) | 320 |
| Water | 70 |
| $NH_4OH$ (28%) | 24 | according to well known phenolic resin technique. The resin is carried to approximately a 30 second cure at 160° C. and utilized in place of the phenolic resin employed in Example I.

Example V

An acid catalyzed resin is prepared by reacting:

| | Parts by weight |
|---|---|
| Phenol | 120 |
| Aqueous formaldehyde (40%) | 92 |
| Water | 18 |
| $H_2SO_4$ | 1.65 | by rapidly heating to 105° C. until ebullition of water and other vapors ceases and heating to 130° C. until no further reaction is visible. The resin so prepared may be used in place of the phenolic resin employed in Example I.

Since the phenolic resin prepared as indicated in this example is of the permanently fusible type the resulting precipitate may be converted into the infusible state by the addition of a methylene-containing body, for example hexamethylenetetramine, before molding, using, preferably, a small amount of lime as a catalyst.

Example VI

Another example of an acid catalyzed phenolic resin is the following:

| | Parts by weight |
|---|---|
| Phenol | 94 |
| Paraformaldehyde | 36 |
| HCl (10%) | 2 | are reacted according to the procedure given in Example V. This resin is used in place of the phenolic resin employed in Example I.

In this case the resin will mold under heat and pressure to the infusible state without addition of any methylene-containing body.

It is to be understood that the process is not confined to the utilization of the exact materials given in the illustrative examples nor to the exact proportions indicated. Various phenols may be employed and other aldehydes may be used in place of formaldehyde in the preparation of the phenolic resin. Similarly, aniline is merely typical of any aromatic amine which may be used in the preparation of the aromatic amine-aldehyde condensation product. The proportion of aldehyde employed in the preparation of the aromatic amine-aldehyde condensation product is not limited to that given in the illustrative examples. It may, for example, vary from about 1.0 mol to about 3.0 mols when the mol ratio of amine to acid is 1:1.

The addition of almost any dye substance which can be either dispersed or dissolved in the alkaline or alcoholic solution of the resin results in a colored precipitate which upon molding imparts the same color to the molded product. Where particularly light colored substances are desired, light colored pigment materials can be mechanically incorporated either as such in the dry resinous powder prior to molding, or as a dispersion in the liquid phase just previous to the precipitation procedure. The resulting molded parts will, of course, no longer be translucent; nevertheless their opacity will not be objectionable since the resulting colors will be surprisingly light and uniform.

The addition of fillers to the resinous products before molding, while not necessary, is not precluded. Such addition will, of course, add to the mechanical strength of the molded product.

The following table compares a typical resin obtained by the present invention and containing no added filler (resin X) with a standard well-known molding composition containing phenol molding resin, filler, and coloring matter (resin Y) and with a typical phenolic precipitated resin containing no added filler (resin Z) obtained by means of the invention disclosed in the copending application of Roy H. Kienle referred to above.

| | (Resin X) | (Resin Y) | (Resin Z) |
|---|---|---|---|
| Impact strength | 1.0–1.2 | .70 | .71 |
| Modulus of rupture | 10,000 | 8,000 | 8,000 |
| Dielectric constant | 5.5 | 6.0 | 5.6 |
| Power factor 25° C., 1000 cycles: | | | |
| (a) Dry | 2.0–2.5% | 3.5% | 3.7% |
| (b) Wet | 2.5–3.0% | 9.0% | 5.5% |
| Dielectric strength | 310 v/mil | 180 v/mil | 250 v/mil |

What we claim as new and desire to secure by Letters Patent of the United States, is:

1. The process of making a moldable composition which comprises reacting at room temperature an aromatic amine with an aldehyde in acid solution to form a resinous composition in solution, separately reacting a phenol and aldehyde to a stage where the resin formed is soluble and has a cure point at 160° C. within the approximate limits 30–120 seconds, dissolving the last named resin in a water-miscible solvent, adding alkali thereto, adding this solution to the solution of resinous composition produced from the amine and aldehyde to form a precipitate, neutralizing any excess alkali or acid, washing and drying the precipitate.

2. The process of making a moldable composition which comprises reacting at room temperature aniline and formaldehyde in aqueous acid solution to form a resinous condensation product in solution, separately reacting a phenol and formaldehyde to a stage where the resin formed has a cure point of approximately 30 seconds at 160° C., dissolving said last mentioned resin in alcohol, adding alkali thereto, adding this solution to the solution of resinous condensation product formed from the aniline and formaldehyde thereby forming a precipitate, neutralizing excess alkali or acid, washing and drying the precipitate.

3. The process of making a molded product which comprises reacting at room temperature an aromatic amine and an aldehyde in aqueous acid solution to form a resinous condensation product in solution, separately reacting a phenol and aldehyde to a stage where the resin formed has a cure point at 160° C. within the approximate limits 30-120 seconds, dissolving said last mentioned resin in a water-miscible solvent, adding alkali thereto, adding this solution to the solution of resinous condensation product formed from the amine and aldehyde thereby forming a precipitate, neutralizing excess alkali or acid, washing and drying the precipitate, and molding under heat and pressure.

4. The process of making a molded product which comprises reacting at room temperature aniline and formaldehyde in aqueous acid solution to form a resinous condensation product in solution, separately reacting a phenol and formaldehyde to a stage where the resin formed has a cure point of approximately 30 seconds at 160° C., dissolving said last mentioned resin in alcohol, adding alkali thereto, adding this solution to the solution of resinous condensation product formed from the aniline and formaldehyde thereby forming a precipitate, neutralizing excess alkali or acid, washing and drying the precipitate, and molding at a temperature of about 130-160° C. and a pressure up to 4000 lbs. sq. in.

5. A moldable resinous composition comprising the washed and dried precipitate obtained by treating an aqueous acid solution of an aromatic amine-aldehyde condensation product with an alkaline solution of a phenolic resin having a cure point at 160° C. within the approximate limits 30-120 seconds.

6. A moldable resinous composition comprising the washed and dried precipitate obtained by treating an aqueous acid solution of an aniline-formaldehyde condensation product with an alkaline solution of a phenolic resin having a cure point at 160° C. of approximately 30 seconds.

7. An article comprising essentially the cured resinous composition of claim 5.

8. An article comprising essentially the cured resinous composition of claim 6.

PAUL F. SCHLINGMAN.
ROY H. KIENLE.